United States Patent [19]
Odru et al.

[11] 3,941,997
[45] Mar. 2, 1976

[54] METHOD AND A DEVICE FOR LOCALIZING A LIGHT IMPACT ON THE PHOTOCATHODE OF A PHOTOMULTIPLIER

[75] Inventors: René Odru, St.-Martin-d'Heres; Jacques Vacher, Sassenage, both of France

[73] Assignee: Commissariat a l'Energie Atomique, Paris, France

[22] Filed: Jan. 17, 1974

[21] Appl. No.: 434,069

[30] Foreign Application Priority Data
Jan. 23, 1973  France ............................ 73.02250

[52] U.S. Cl. .......... 250/207; 250/203 CT; 250/549; 313/103 R
[51] Int. Cl.² ........................................ H01J 39/12
[58] Field of Search ......... 250/207, 203 CT, 237 G, 250/549, 206, 214 R; 313/103–105

[56] References Cited
UNITED STATES PATENTS

| | | | |
|---|---|---|---|
| 2,892,949 | 6/1959 | Hardy | 250/214 X |
| 3,281,601 | 10/1966 | Sheftelman | 250/203 R |
| 3,614,240 | 10/1971 | Brandtj et al. | 250/203 CT |

*Primary Examiner*—Walter Stolwein
*Attorney, Agent, or Firm*—Lane, Aitken, Dunner & Ziems

[57] ABSTRACT

A light impact on the photocathode of a photomultiplier is localized by defocusing the beam of emitted photoelectrons, sweeping the surface of the photocathode by means of a localized electric field which is located in the vicinity of the photocathode and by measuring the time which elapses between the instant of commencement of sweeping of the photocathode surface and at least one change of sign of the anode signal.

8 Claims, 5 Drawing Figures

METHOD AND A DEVICE FOR LOCALIZING A LIGHT IMPACT ON THE PHOTOCATHODE OF A PHOTOMULTIPLIER

This invention relates to a method and a device for localization of a light impact on the photocathode of a photomultiplier.

In more exact terms, it is desired to determine the ordinate and the abscissa of a light impact produced, for example, by a scintillator on the input window of a photomultiplier.

A photomultiplier comprises within a single enclosure a transparent photocathode which constitutes the input window of the apparatus, a plurality of secondary-emission electrodes or dynodes having the intended function of multiplying the number of incident electrons and an electron-collecting anode.

The present invention makes use of a phenomenon which has been observed by Charpak and which will now be briefly explained in order that the present invention may be more readily understood.

An electric field which is localized in the immediate vicinity of a light impact on the photocathode of a photomultiplier modifies the emission of the photoelectrons produced by the incident photons, thereby affecting the anode signal of the photomultiplier. If the time of application of the electric field is considerably shorter than that of the light, there is observed in the anode signal of the photomultiplier a deformation which is synchronized with the instant of application of the electric field, subject to the time constant of the photomultiplier.

More precisely, the predominant effect of the electric field appears to be that of local defocusing of the input optical-electronic system of the photomultiplier rather than a direct action on the emission of photoelectrons; in other words, the field appears to produce a modification in the distribution of the equipotential surfaces which are close to the photocathode and therefore to act on the trajectory of the photoelectrons emitted in the zone of incidence of the photons. When the action is sufficient to cause an appreciable modification in the proportion of electrons which arrive in the active portion of the first dynode, that is to say on the first "amplification" plate of the photomultiplier, this is represented by a "hole" in the anode signal which is delivered by the photomultiplier and has a width equal to the time of application of the electric field.

By sweeping the entire surface of the photocathode with a point electric field and by detecting the instant of appearance of said "hole" in the anode signal, it is therefore possible to localize the position of the light impact provided that the sweeping time is shorter than the persistence of the light on the input window of the photomultiplier.

Unfortunately, the electric field produced at one point is not really a single-point field and this is evidenced by the fact that, when sweeping the surface of the photocathode, there are a number of points of application of the electric field which will cause deformation of the anode signal. In consequence, a deformation of the anode signal appears not only at the moment when the electric signal is applied at the point of impact of the light beam but also when the electric signal is applied at adjacent points. Localization cannot therefore be achieved in an accurate manner.

The precise aim of the present invention is to provide a method and a device for localization of a light impact which overcomes the disadvantages mentioned in the foregoing.

The method is characterized in that the beam of emitted photoelectrons is defocused, that the surface of the photocathode is swept by means of a localized electric field, said electric field being located in the vicinity of the photocathode, and that a measurement is taken of the time which elapses between on the one hand the instant of commencement of sweeping of the photocathode surface and on the other hand at least one change of sign of the anode signal.

In a preferred embodiment, sweeping of the photocathode is obtained in two orthogonal directions of a substantially linearly localized variation of electric field and a measurement is taken of a first time interval $T_1$ between the commencement of the sweeping in a first direction and a first change of sign and of a second time interval $T_2$ between the commencement of the sweeping in the second direction and a second change of sign.

In a preferred alternative embodiment, the beam of photoelectrons is defocused by applying a transverse magnetic field.

In accordance with another advantageous feature of the method, each change of sign is detected by splitting the anode signal, by delaying one of the two signals thus obtained and shifting said signal in amplitude, and there is detected the time which elapses between the leading edge of the anode signal and the intersection of said split signals which have previously been processed.

The device for the practical application of the method is characterized in that it comprises:
— a photomultiplier,
— two networks of parallel conductors which are crossed and insulated with respect to each other, said networks being placed in the vicinity of the photocathode of the photomultiplier,
— means for applying an electrical pulse successively to said conductors,
— means for defocusing the beam of photoelectrons emitted by said photocathode,
— means for splitting the signal collected at the anode of said photomultiplier into two identical signals $S_1$ and $S_2$,
— means for delaying the signal $S_2$ and adding a constant shift voltage thereto,
— means for detecting the instants of equality of the processed signals $S_1$ and $S_2$.

A clearer understanding of the invention will in any case be obtained from a study of the following specification in which a number of embodiments of the method according to the invention are described, reference being made to the accompanying drawings, in which.

If an electric-field pulse $I_1$ is applied in the vicinity of the light impact in the photocathode region of a photomultiplier, it is observed on the anode signal of said photomultiplier that the collected signal A has a "hole" 2 which is equal in width to the time of application of the electric-field pulse $I_1$. The hole 2 clearly appears after a time interval T which corresponds to the time constant of the photomultiplier, i.e., the delay T between the incidence of light and the appearance of a corresponding electric signal at the output of the photomultiplier. If no consideration is given to said time interval T which is very short and in any case constant, it may be stated that these two phenomena are synchronized.

Figure 1:
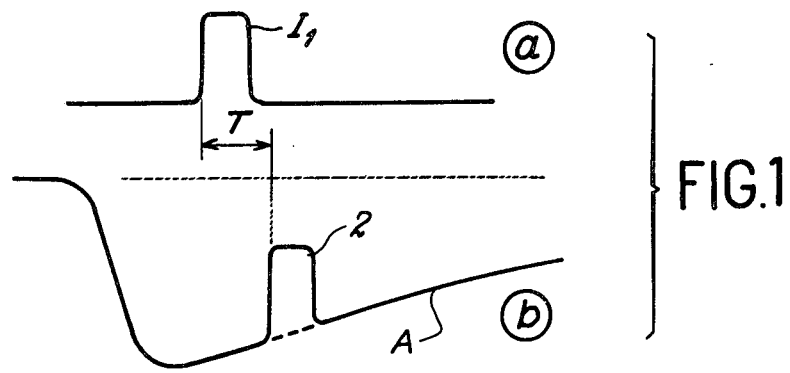
FIG. 1 shows the curves which represent the effect of application of an electric-field pulse in the vicinity of the light impact.
Figure 2:
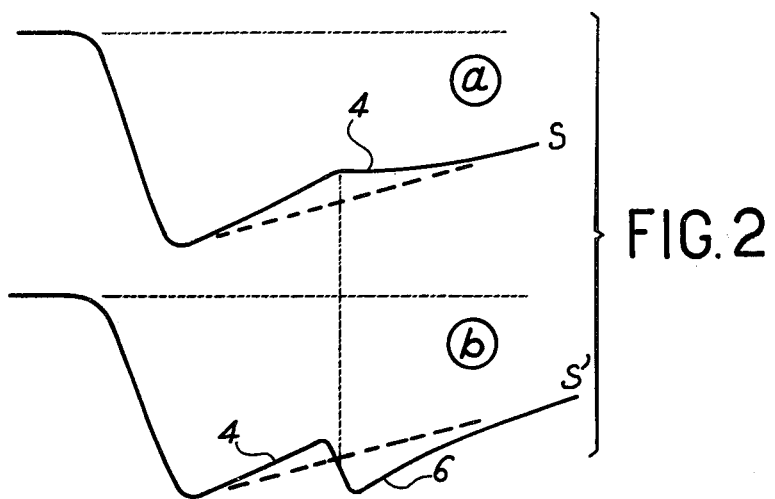
FIG. 2 shows the result of application of an electric-field pulse when the photomultiplier is defocused and when the photomultiplier is not defocused.

There is shown in FIG. 2 the signal S at the output of the photomultiplier when this latter is correctly focused (2a) and when the photomultiplier is slightly defocused (2b).

It is observed in FIG. 2a that there is a deformation 4 of the signal S which corresponds to the hole and therefore to the application of the electric field in the vicinity of the light impact. If the photomultiplier is slightly defocused, the signal S' exhibits a double deformation. For example, it is possible to have first a deformation corresponding to a hole 4, then a reverse deformation corresponding to a "bulge" 6. The position of the light impact corresponds to the transition from the hole 4 of the bulge 6.

This phenomenon can be explained as follows: in the case of an electric field which is located slightly "to the right" of the light impact, there is for example an increase in defocusing, which results in the hole 4. On the contrary, in the case of an electric field which is located slightly to the left of the light impact, maximum focusing takes place and this results in the bulge 6. It is found that, in order to determine the position of the light impact, it is no longer necessary to detect a maximum value as in FIG. 2a but a change of sign (transition from the hole to the bulge) of the cruve S' if one takes as a reference level the curve (shown in dashed lines) representing the output signal without applying any electric-field pulse. This is the meaning which must be given to the expression "change of sign" in the following description and in the appended claims.

Figure 3:
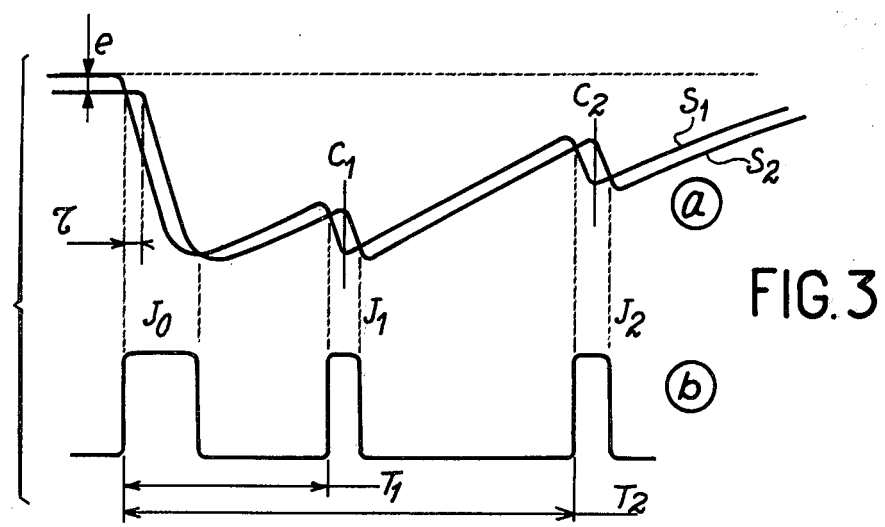
FIG. 3 shows curves which serve to illustrate the detection of the point of impact of the light beam.

There is shown in FIG. 3 a method of detection of the position of the light impact. The signal S is split into a signal $S_1$ and $S_2$, the signal $S_2$ being delayed in time by an interval $\tau$ and shifted in amplitude by a potential difference $e$. The points of intersection of these two cruves correspond to the localization of the light impact as abscissae and as ordinates. The change of sign $C_1$ corresponds for example to the abscissa X of the light impact and the change of sign $C_2$ corresponds for example to the ordinate Y of the impact. It is therefore only necessary to determine from the origin instant the time intervals $T_1$ and $T_2$ which correspond respectively to the change of sign $C_1$ and $C_2$.

One advantage of this method lies in the fact that the instants of change of signs are not dependent on the amplitude of the photomultiplier and this is of major importance since the response of this latter varies to an appreciable extent as a function of the position of the point of light impact on the input window. Furthermore, in the case in which the light impact is not in the form of a point, the logical signals have a width which is a function of the luminous spot (since the change of signs of the deformation of the anode signal takes place during the passage of the electric-field wave on the spot). This accordingly makes it possible to determine the center of mass which is in the majority of instances the most representative of the physical phenomenon which has given rise to the emission of light.

Figure 4:
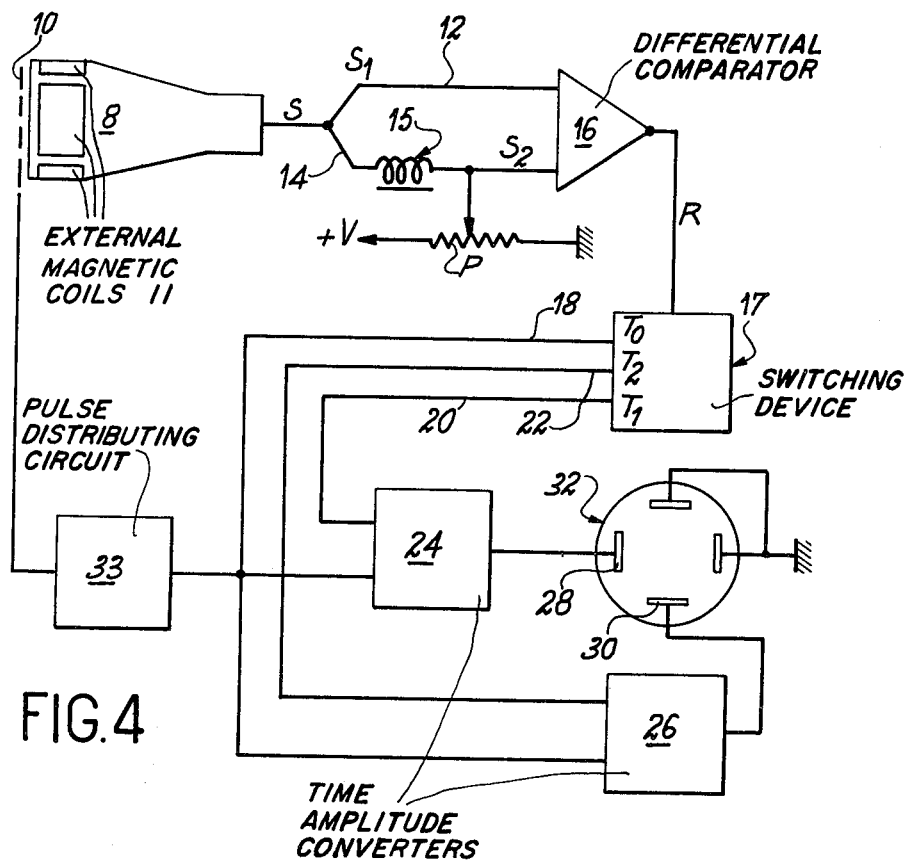
FIG. 4 is a block diagram of the device.

The complete device as shown diagrammatically in FIG. 4 comprises a photomultiplier 8 of known type, the input window of which is fitted with two parallel networks of conductors stretched over the photocathode and oriented along two orthogonal axes, this assembly being represented by the reference 10. By means of this double network, two "excitation" electric-field waves can be applied to the photocathode in order that the pulses employed for the purpose of localization may be caused to appear on the output signal of the photomultiplier. In order to produce defocusing of the photomultiplier, external magnetic coils can be placed within the space between the photocathode and the first dynode, thus creating a transverse magnetic field. The schematic representation of these coils in FIG. 4 is designated by the reference number 11.

The output signal S is split in the lines 12 and 14. The line 14 comprises a delay device 15 which produces a time-delay $\tau$. A shift voltage $e$ is injected into the line 14 by means of the voltage divider constituted by the potentiometer P, one end of which is brought to the voltage + V and the other end of which is connected to ground.

The signals $S_1$ and $S_2$ are fed into the two inputs of the differentially mounted comparator 16. This latter delivers a logical signal R having a logical level of zero if $S_2$ is higher than $S_1$ and a logical level of one in the contrary case. As has been mentioned earlier, this signal comprises three pulses $J_0$, $J_1$ and $j_2$ corresponding respectively to the leading edge of the anode signal, to the abscissa X of the light impact and to the ordinate Y of the light impact. The signal R is fed into a three-output switching device 17 which transmits the first pulse to the line 18, the second pulse to the line 20 and the third pulse to the line 22. The lines 18 and 20 are connected to the two inputs of a time-amplitude converter 24. This latter delivers a constant analog signal whose amplitude is proportional to the time interval which elapses between the pulses $J_0$ and $J_1$. The lines 18 and 22 are connected to the two inputs of a time-amplitude converter 26 which performs the same operation in the case of the pulses $J_0$ and $J_2$.

The outputs of the converters 24 and 26 are connected for example to the control plates 28 and 30 of an oscilloscope 32. The line 18 is also connected to a pulse distributing circuit 33 for driving the localization wires 10, said circuit being intended to deliver an electrical pulse successively to each horizontal conductor and then to each vertical conductor.

The excitation-voltage pulses must necessarily have a duration at least equal to the time interval which elapses between the drive applied to two consecutive wires in order to obtain a continuous electric-field sweep at the surface of the photocathode. Each network of parallel wires is thus equivalent to a wave-propagation line having a width equal to the diameter of the photocathode. It must also be ensured that the total time of sweeping by the electric field is shorter than the time of persistence of the light impact on the photocathode of the photomultiplier.

The circuit 33 is constituted by a generator which delivers square-topped voltage pulses having a timeduration $t'$. Each square-topped pulse is directed towards one of the horizontal wires or towards one of the vertical wires by means of delay devices which produce a time interval t between the instant of application of drive to one wire and the instant of application of drive to the following wire, with $t' > t$. The generator is triggered by the pulse $J_0$ and could clearly be triggered with a certain delay, in which case the time intervals $T_1$ and $T_2$ are measured from the instants of initiation of the X and Y sweeps of said generator.

It is readily apparent that the foregoing description of this mode of sweeping of the photocathode is given without any limitation being implied and that other types of sweeping could be employed.

The magnetic coils which serve to apply a defocusing magnetic field between the photocathode and the first dynode have not been shown in the figure since they are of a well-known type.

The operation of the device can readily be deduced from the method. It should be noted, however, that the voltage delivered by the converter 24 is proportional to the time interval $T_1-T_0$ which elapses between the pulses $J_0$ and $J_1$. This time interval is in turn proportional to the abscissa X of the point of impact of the light beam. Similarly, there is a linear relation between the time interval $T_2-T_0$ and the ordinate of the light impact.

Figure 5:
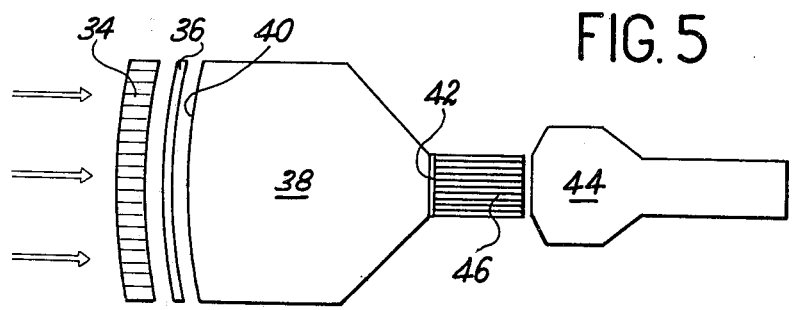
FIG. 5 is a schematic diagram of utilization of the light-impact detection device for the construction of a γ-radiation camera.

There is shown in FIG. 5 one example of application of the light-impact localization device to the construction of a γ-radiation camera.

The camera comprises a collimator 34, a scintillator 36, an image amplifier 38 in which the entrance face is constituted by a photocathode 40 and the exit face is a fluorescent screen 42. The amplified image is transmitted to the localization device 44 by an optical-fiber bundle 46. The γ radiation produces an image in the scintillator and this latter emits photons, the intensity of which is amplified in the image amplifier 38.

The device in accordance with the invention can also be employed for constructing a neutron camera. It is only necessary to place a neutron-photon converter in front of the input window of the photomultiplier. By way of example, it is possible to employ a lithium fluoride scintillator, in which case the image amplifier 38 is not indispensable.

The light-impact localization device offers many advantages over other known devices which perform the same operation:

— the time of analysis of each event is very short;

— the device makes use of only one photomultiplier to which it is only necessary to add the network of conductive wires and the defocusing coils;

— the device makes it possible to determine the energy of the light signal since it is only necessary to integrate the output signal of the photomultiplier, the areas corresponding to the "bulge" and to the "hole" being substantially compensated.

What we claim is:

1. A method of localization of a light impact on the photocathode of a photomultiplier, comprising defocusing the beam of emitted photoelectrons of said photomultiplier, sweeping the surface of the photocathode by means of a localized electric field, said electric field being located in the vicinity of the photocathode, and measuring the time which elapses between on the one hand the instant of commencement of sweeping of the photocathode surface and on the other hand at least one change of sign of the anode signal of said photomultiplier.

2. A method according to claim 1, wherein sweeping of the photocathode is obtained by sweeping in two orthogonal directions a localized electric field and wherein a measurement is taken which is indicative of a first time interval $T_1$ between the commencement of the sweep in one direction and a first change of sign of the anode signal and of a second time interval $T_2$ between the commencement of the sweep in the other direction and a second change of sign of the anode signal.

3. A method according to claim 1, wherein the beam of photoelectrons is defocused by applying a magnetic field transverse to the beam of photoelectrons.

4. A method according to either claim 2, wherein each change of sign is detected by splitting the anode signal, by delaying one of the two signals thus obtained and of setting the amplitude thereof, and wherein there is detected the time which elapses between the leading edge of the anode signal and the intersection of said split signals which have previously been processed.

5. A method according to claim 1 wherein, in order to produce the localized electric field, a voltage pulse is applied successively to each line and to each column of two concurrent networks of parallel conductors, the time-duration of said pulse being at least equal to the transit time of said pulse between two successive elements.

6. A device for carrying out the method according to claim 1, wherein said device comprises:

a photomultiplier of known type, two networks of parallel conductors which are crossed and insulated with respect to each other, said networks being placed in the vicinity of the photocathode of the photomultiplier, means for applying an electrical pulse successively to each of said conductors, means for defocusing the beam of photoelectrons emitted by said photocathode, means for splitting the signal collected at the anode of said photomultiplier into two identical signals $S_1$ and $S_2$, means for delaying the signal $S_2$ and adding a constant shift voltage thereto, means for detecting the instants of equality of the processed signals $S_1$ and $S_2$.

7. A device according to claim 6, wherein the means for defocusing the beam of photoelectrons consists of magnetic coils which are external to the photomultiplier, said coils being placed between the photocathode and the first dynode of said photomultiplier.

8. A device according to claim 6, wherein the means for applying an electrical pulse are constituted by a generator which delivers square-topped voltage pulses and is triggered by the leading edge of the anode signal of the photomultiplier, the time-duration of each square-topped pulse being at least equal to the time which elapses between application of a square-topped pulse to two consecutive conductors.

* * * * *